United States Patent [19]

Mielo

[11] Patent Number: 5,577,575
[45] Date of Patent: Nov. 26, 1996

[54] METHOD AND APPARATUS FOR SWEEPING MOISTURE AND DIRT FROM RETURNING OIL OF A CIRCULATING LUBRICATION SYSTEM

[75] Inventor: Ari Mielo, Oulu, Finland

[73] Assignee: Safematic Oy, Muurame, Finland

[21] Appl. No.: 481,263

[22] Filed: Jun. 30, 1995

[30] Foreign Application Priority Data

Jan. 4, 1993 [FI] Finland ................................ 930007

[51] Int. Cl.$^6$ ................................... F01M 1/10
[52] U.S. Cl. ..................... 184/6.24; 210/168; 95/254; 95/261; 95/263; 96/202; 96/217; 184/55.1
[58] Field of Search ................ 184/6.23, 6.24, 184/55.1, 57; 210/168, 171, 172; 95/254, 261, 263; 96/202, 217

[56] References Cited

U.S. PATENT DOCUMENTS

| 934,953 | 9/1909 | Witt | 184/55.1 |
|---|---|---|---|
| 3,722,624 | 3/1973 | Buckland. | |
| 4,142,608 | 3/1979 | Sarle. | |

FOREIGN PATENT DOCUMENTS

| 455950 | 11/1991 | European Pat. Off.. |
| 513957 | 11/1992 | European Pat. Off.. |

*Primary Examiner*—Edward K. Look
*Assistant Examiner*—Christopher Verdier
*Attorney, Agent, or Firm*—Cushman Darby & Cushman, L.L.P.

[57] ABSTRACT

A method and an arrangement in a circulation lubrication system including a lubricating oil tank; pressure pipe lines for supplying oil to parts to be lubricated; return pipe lines for returning the oil from the parts to be lubricated to the oil tank. To eliminate problems caused by moisture, a blower is arranged to blow air into the oil tank, and at least one valve is positioned in the oil return pipe lines, the valve being arranged to allow the discharge of the air blown into the oil tank and the air with moisture and dirt flowing in the return pipe lines from the oil return pipe lines.

10 Claims, 3 Drawing Sheets

METHOD AND APPARATUS FOR SWEEPING MOISTURE AND DIRT FROM RETURNING OIL OF A CIRCULATING LUBRICATION SYSTEM

BACKGROUND OF THE INVENTION

The invention relates to a method designed to be practiced in a circulation lubrication system comprising a lubricating oil tank; pressure pipe lines for supplying oil to parts to be lubricated; return pipe lines for returning the oil from the parts to be lubricated to the oil tank; means for pumping oil into the pressure pipe lines; and adjusting means for maintaining a desired lubrication situation, wherein air is blown into the lubricating oil tank. The invention further relates to an arrangement for blowing air into the oil tank in a circulation lubrication system.

Circulation lubrication systems are today used widely to lubricate various machines especially when the lubricant is used for cooling the part needing lubrication. An example of the use of circulation lubrication is the lubrication of the bearings of the drying cylinders in paper machines or the lubrication of gas turbines. In both cases the bearings are subject to a thermal load from the outside.

Circulation lubrication is also used when the part to be lubricated creates considerable dissipation power. One example of such applications is the lubrication of gear boxes.

Still another use of circulation lubrication is in cases where the lubricant may get dirty in the part to be lubricated, and it should be possible to reuse the lubricant after cleaning.

A circulation lubrication system usually comprises a pump operated by an electric motor. The pump brings the oil into motion. The output of the pump is usually selected so that it exceeds the required flow rate by 10 to 20%, so that a sufficient operating margin is left for the control of bypass pressure. Oil is arranged to pass through replaceable filters. The filters are often arranged in two groups so that one group can be separated by means of Valves and the filters changed without having to stop the entire assembly. An electric or steam-operated heater is often used for further heating the oil. The oil is cooled by a heat exchanger having water or air cooling means. The cooling power is adjusted by a temperate regulator provided for supply oil. The set value of the temperature regulator is often typically about 55° C. Pressure control is often effected by a bypass valve back to the oil tank. Depending on the system, the set values of the pressure controller typically vary between 5 and 20 bar.

Oil is supplied to parts needing lubrication, such as different parts in a paper machine, by means of pressure trunk pipes usually made of a rustproof material. The oil flows in the pipes as a laminar flow, and so the pressure drop is small. From the trunk pipes, the oil is distributed to a plurality of flow-metering boards wherefrom it is divided into rising pipes, to be supplied to a number of parts to be lubricated. From these parts, the oil is passed through return pipes by utilizing gravitation, into collector pipes on the return side. It is passed, under the influence of gravitation, through the collector pipes, into the tank of the circulation lubrication assembly. The pipes on the return side are never full of oil. The inclination of the pipes is about 2 to 3% towards the tank of the assembly. Before the tank, the return oil is passed through a coarse-mesh filter. Oil returned into the tank is then again sucked into circulation by the pump. The dimensions of the tank are usually such that the oil stays in the tank for 10 to 50 minutes, depending on the viscosity of the oil.

In the system, the tank has several functions for conditioning the oil before recirculation. One function of the tank is to allow air bubbles contained in the oil to rise to the surface. Air bubbles may increase the liability of the pump to cavitation, and they may deteriorate the lubricant film formed on the part needing lubrication. Another function is to allow large dirt particles having a density considerably higher than that of oil to deposit on the bottom of the tank. To some extent, water drops contained in the oil will also fall down in the tank. The density of water is so close to that of oil that the falling speed is low. The tank condenses moist air flowing in the return pipes on the tank walls and drains the water along the walls, thus collecting it on the bottom of the tank. The tank also cools the oil through the walls. Furthermore, the tank forms a space into which the pipe lines are emptied at system shut-downs, and the tank serves as an oil storage vessel in the case of a pipe leakage, so that the machine to be lubricated can be shut down controllably. Still another function of the tank is to ensure that there is always oil in the pump suction means, in order that air will not be sucked along. The moisture and suitable temperature also enable bacteria to grow in the tank.

The tank also has associated therewith thermostat-controlled oil heaters, which may be electric heaters or steam-operated heaters. The heaters are used to heat the great amount of oil contained in the oil tank within 4 to 8 hours, typically to about 55° C., before the system is started, as the screw pumps used are not able to pump cold oil of high viscosity at full power without the risk of cavitation.

In principle, the systems described above operate well; in practice, however, they have several drawbacks, as a result of which the operation of the systems is not the best possible. One drawback is the entrainment of moist air into the tank through the return pipes, as the oil sucks air along with it from the part to be lubricated, and the air carries dirt and moisture with it. This drawback is especially apparent in paper machines, as there is plenty of both dirt and moisture below the hood, in the drying section. Moreover, it is to be noted that the temperature is high below the hood due to the steam heating of the drying cylinders. The moisture content of the air is high due to the moisture evaporated from the paper web. As a result of the flow of moist air, considerable amounts of water are condensed in the tank, which causes problems in the tank.

SUMMARY OF THE INVENTION

The object of the invention is to provide a method and an arrangement, by means of which the drawbacks of the prior art can be eliminated. This is achieved by means of a method according to the invention, which is characterized in that the air blown into the tank is discharged from the oil tank through the oil return pipe leading into the oil tank, and that the air blown into the oil tank and the air with moisture and dirt flowing in the return pipe are removed from the oil return pipe outside the oil tank. The arrangement according to the invention, in turn, is characterized in that the arrangement comprises at least one valve means positioned in the oil return pipe lines, the valve means being arranged to allow the discharge of the air blown into the oil tank and the air with moisture and dirt flowing in the return pipe lines from the oil return pipe lines.

An advantage of the invention is mainly that the entrance of moist air into the lubricant tank can be prevented, so that the problems caused by the condensation of moisture in the tank are eliminated. Another advantage of the invention, is that it is simple so that its reliability in operation is high and it is economical to take into use. The invention also allows the operation of the circulation lubrication system to be improved, as the quality of oil can be kept higher than previously. This is due to the fact that water cannot condense in the oil to such an extent as previously, as a result of which the time and space required for the separation of water can be diminished as compared with the prior art solutions, etc.

BRIEF DESCRIPTION OF THE DRAWINGS

In the following the invention will be described more closely by means of preferred embodiments shown in the attached drawings, wherein.

DETAILED DESCRIPTION

Figure 1:
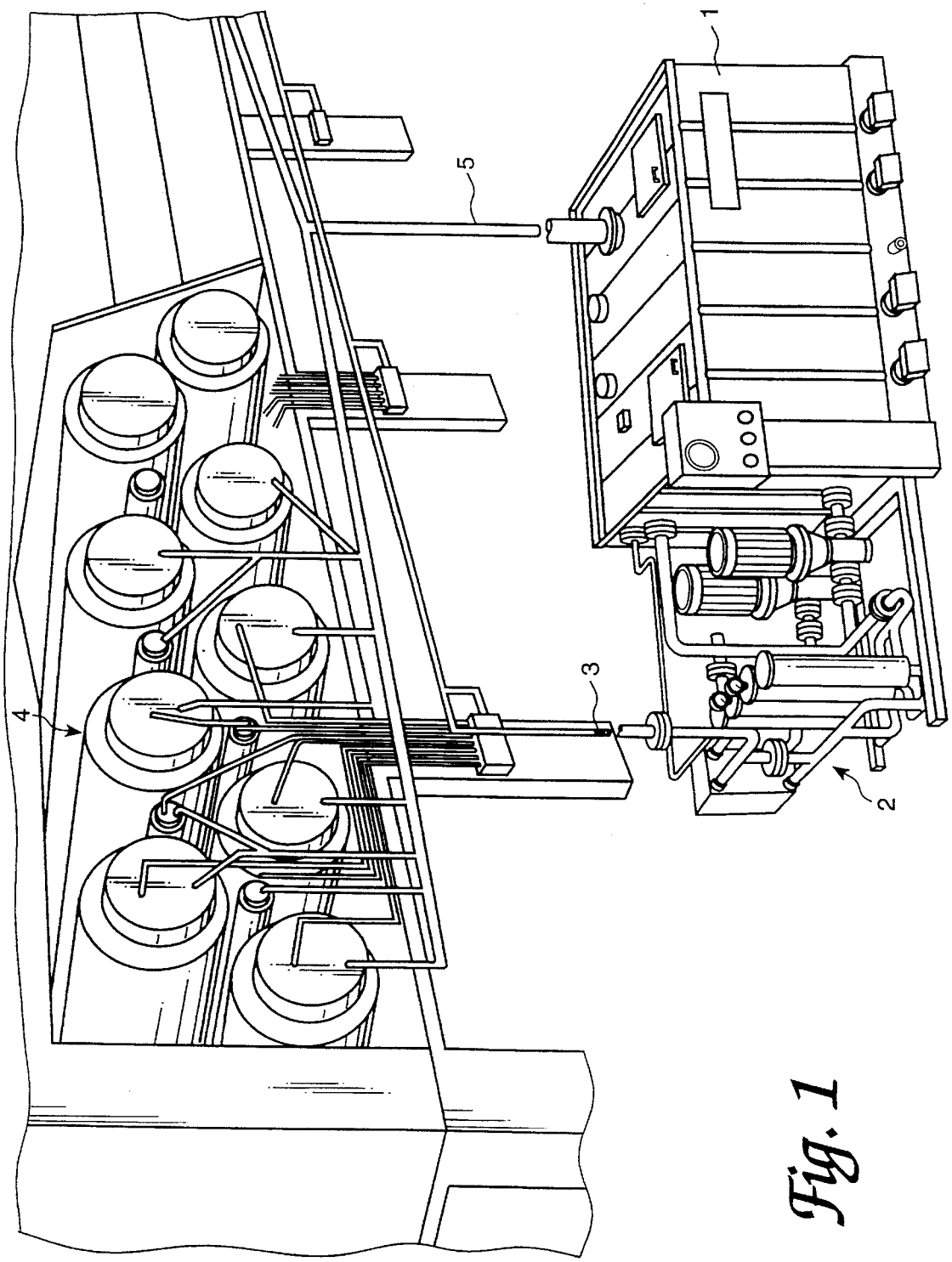
FIG. 1 is a general view of a circulation lubrication system for a paper machine.

FIG. 1 is a general view of a circulation lubrication system for a paper machine. The reference numeral 1 indicates an oil tank, and the reference numeral 2 indicates generally an assembly comprising pumps, filters and other similar devices. The reference numeral 3 shows pressure pipe lines for supplying oil used as a lubricant to parts 4 to be lubricated, in this special case drying cylinders in the paper machine. Further in FIG. 1, the reference numeral 5 indicates return pipe lines for returning the oil from the parts to be lubricated to the oil tank 1. The structure and operation of the system shown in FIG. 1 are obvious to one skilled in the art, so these matters will not be described more closely herein.

Figure 2:
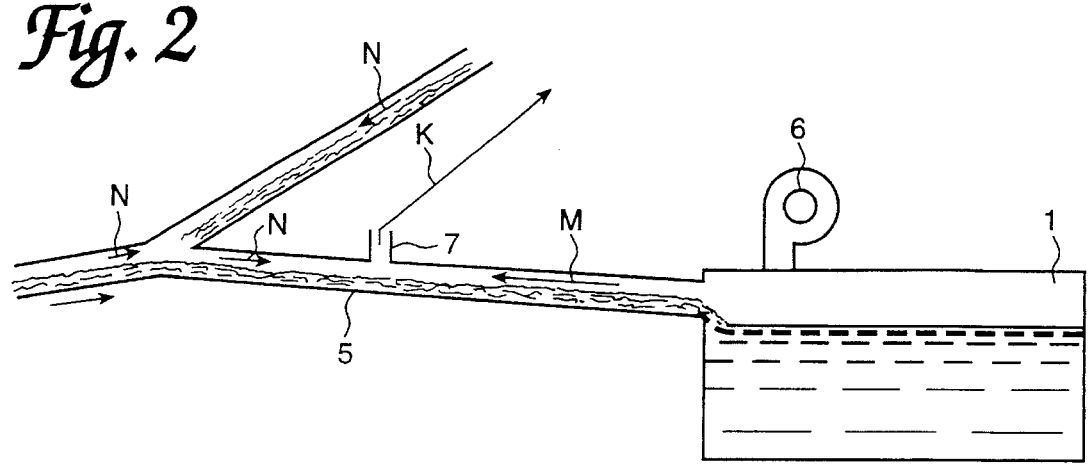
FIG. 2 is a general view of a portion of the circulation lubrication system utilizing a first embodiment of the invention.

The invention is specifically concerned with the return pipe lines 5 of the circulation lubrication system. FIG. 2 is a general view of a first embodiment of the arrangement according to the invention. According to the essential idea of the invention, a blower 6 is arranged to blow air into the lubricant tank 1. The air blown into the tank 1 is passed out of the oil tank 1 through the return oil pipe 5 leading into the tank, and the air blown into the tank and the air with moisture and dirt flowing in the return pipe lines are discharged from the return pipe 5 outside the tank 1. In the embodiment of FIG. 1, the air blown into the oil tank 1 by the blower 6, and the air with moisture and dirt flowing in the return pipe lines 5 are removed from the return pipe at a point a little before the oil tank 1 in the direction of flow of the oil. The removal of air from the return pipe 5 into the ambient air takes place through a valve means 7. The flow of air with moisture and dirt in the return pipe 5 is indicated by the arrows N. The flow of air blown into the tank 1 by means of the blower 6 is indicated in FIG. 1 by means of the arrow M. Further in FIG. 1, the flow of the air discharged from the return pipe into the ambient air through the valve means 7 is indicated by means of the arrow K. It is to be noted that the flow K consists of the flow N and the flow M. Oil flows in the return pipe 5 towards the tank 1, and the tank 1 is air-tight, so that the flow of air into the tank through the return pipe 5 is not possible. The air blown by the blower 6 into the tank 1 scavenges the tank walls and dries them out. Moisture is removed from both the tank and the return pipe lines by causing the air to flow as described above.

Figure 3A:
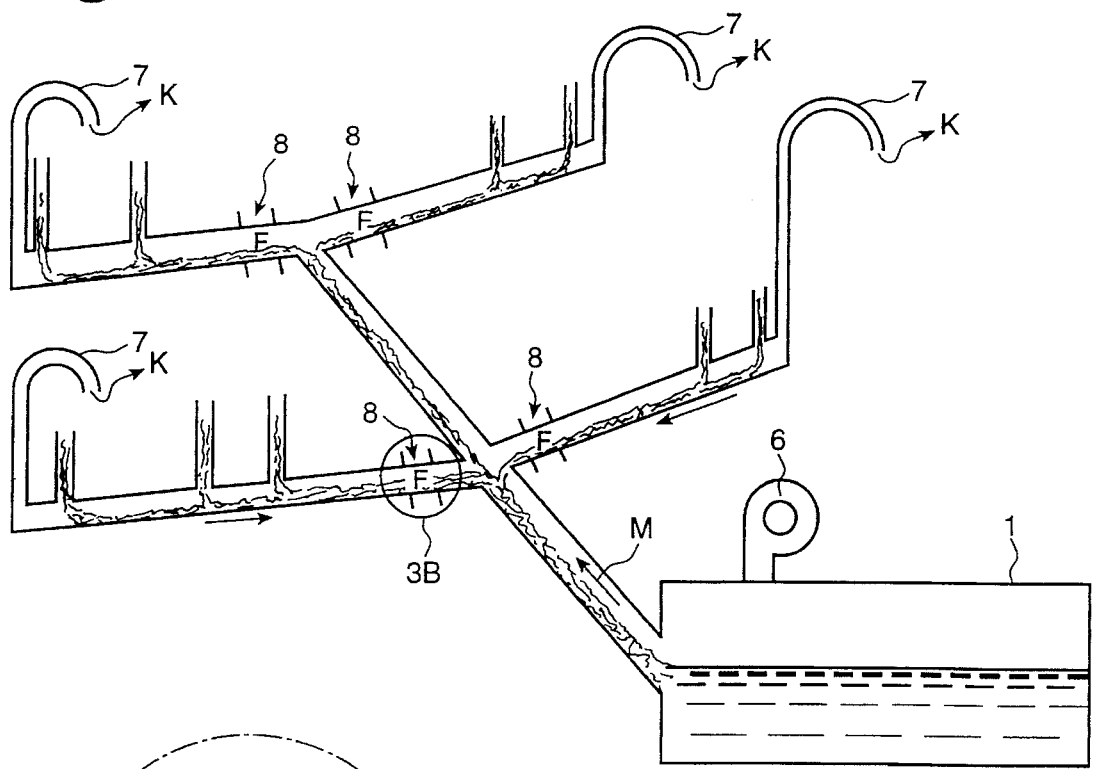
FIG. 3 is a general view of a portion of the circulation lubrication system utilizing a second embodiment of the invention.
Figure 3B:
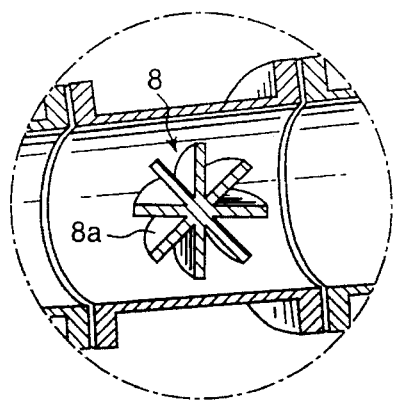

FIG. 3 shows a second embodiment of the arrangement according to the invention. The embodiment of FIG. 3 corresponds essentially to the embodiment of FIG. 2. The same reference numerals as in FIG. 2 are used in FIG. 3 at corresponding points. The embodiments of FIGS. 3 and 2 differ in that, in the embodiment of FIG. 3, the air blown into the oil tank 1 by means of the blower 6 is passed evenly into the return branches of the return oil pipe lines 5. The air M blown into the oil tank 1 and the air containing moisture and dirt from the part lubricated are removed from the return pipe lines through the valve means 7 positioned at the inlet ends of the return branches as seen in the direction of flow of the oil. In FIG. 3, the discharge flow through the valve means 7 at the inlet ends of the return branches is indicated by the arrow K.

In the embodiment of FIG. 3, an essential detail is an air flow control means 8 which prevents the flow of air in the direction of the oil flow whereas it allows the flow of air against the direction of the oil flow. The air flow control means 8 passes the air supplied by the blower 6 evenly into the return branches. In FIG. 3, the position of the air flow control means 8 in the return branches of the return pipe 5 is indicated by the reference F. The aim is that no air flows in the direction of the oil flow but a small air flow opposite to the oil flow is created in the return pipe 5. This is effected by the flow M produced by the blower 6 and the control means 8.

Figure 4:
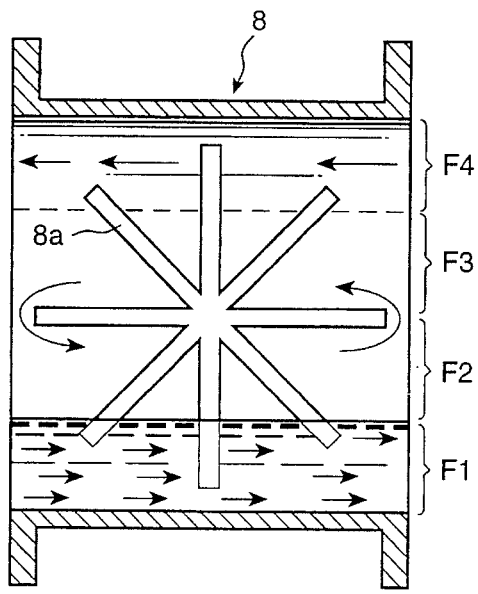
FIGS. 4 to 6 are general views of alternative embodiments of a detail of the arrangement of FIG. 3.

The air flow control means 8 may be e.g., an impeller means 8a shown in FIGS. 3 and 4. The idea of the impeller means 8a is that it is rotated by the flow of oil on the bottom of the pipe. The principle is illustrated in FIG. 4. The surface level of the oil flowing in the pipe is indicated by F1. Portions F2 and F3 of the impeller means 8a do not participate in the pumping of air, as they compensate each other: portion F2 carries air in the direction of the oil flow, while portion F3 carries air against the oil flow. Portion F4 is equal in size to portion F1 defined by the surface level of oil. It forces the air against the oil flow. In FIG. 4, the directions of the flows are indicated by means of arrows.

Figure 5:
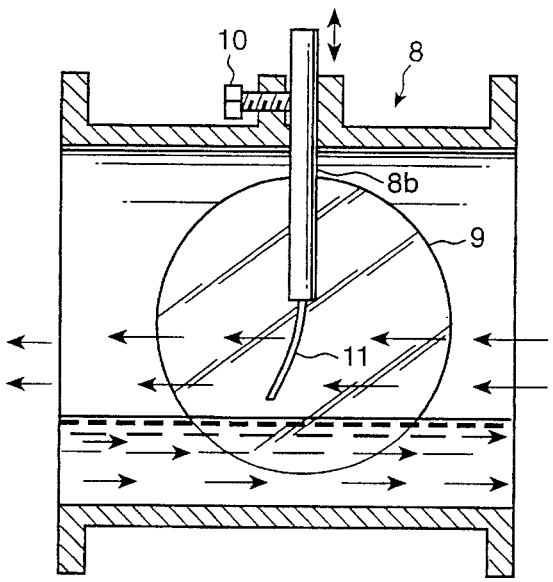

FIG. 5 shows another embodiment of the air flow control means 8, comprising a plate member 8b. The structure also comprises a sight glass 9 for monitoring the process. As the plate member 8b is moved in the vertical direction, the air flow path can be throttled or enlarged. The member 8b may be locked in position by means of a locking screw 10, for instance. A flexible strip 11 provided at the end of the plate member 8b indicates the direction of the air flowing in the pipe. In FIG. 5, the directions of the air and oil flows are indicated by arrows. In the situation shown in FIG. 5, air flows to the left and oil to the right. The plate member 8b provided in each return branch at point F enables the amount of air produced by the blower 6 to be distributed evenly between the branches.

Figure 6:
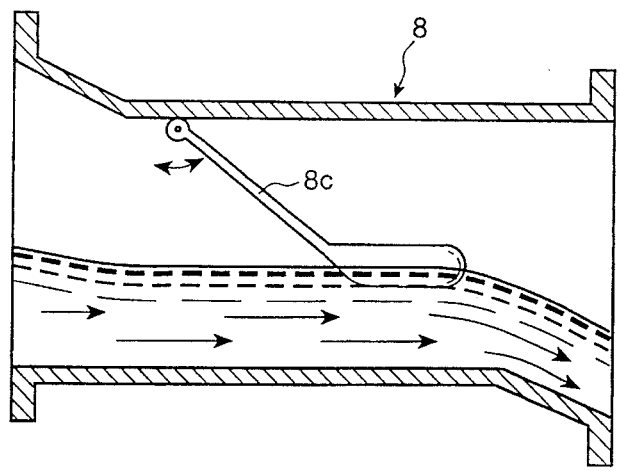

FIG. 6 shows a third embodiment of the air flow control means 8. This embodiment comprises a part 8c floating on the surface of the oil flow. The upper end of the part 8c is hinged movably to the pipe. The part 8c closes the airflow except for a small leakage flow. The cross-section of the pipe at the part 8c is preferably square. The blower 6 maintains a small overpressure in the tank 1 and on the downstream side of the points F of the return pipes, thus preventing the moist air from bypassing the points F, that is, through the leakage of the parts 8c, into the tank 1. In FIG. 6, the direction of the oil flow is indicated by means of arrows.

The above-described embodiments are by no means intended to restrict the invention, but the invention can be modified within the scope of the claims as desired. Accordingly, it is obvious that the arrangement according to the invention or its details need not necessarily be similar to those shown in the figures but other solutions are possible as well. For instance, any suitable means may be used as the valve means through which air is removed from the return flow pipe. The blower may be any suitable blower, etc.

I claim:

1. A method for removing dirt and moisture flowing back toward an oil tank of a circulating oil-type lubricating system, comprising:

causing oil to flow from said oil tank towards at least one part in need of lubrication, into and from lubricating contact with said part, and back to the tank in at least one return line, and thereby causing said dirt and moisture to be entrained in a head space of said return line and to flow toward the tank with the oil in said return line;

providing at least one outlet from said head space between said oil tank and said part; and pumping air from externally of said system, into said tank, thereby causing an overpressure in a head space of said tank, thereby causing an air flow in said head space of said return line counter to the flow of oil returning to said tank in said return line, and sweeping said moisture and dirt in said head space of said return line out of said outlet with said air of said air flow.

2. The method of claim 1, wherein:

said at least one outlet is located adjacent said oil tank.

3. The method of claim 1, wherein:

said at least one return line comprises a plurality of return lines each having said at least one outlet, and said pumping is conducted so as to blow equivalent amounts of air into each of said return lines.

4. A circulating oil-type lubricating system for at least one part in need of lubrication, comprising:

an oil tank;

at least one pressure pipeline extending from the oil tank to said part, and arranged to cause oil to flow from the tank, into lubricating contact with said part;

at least one return line extending from said part back to said tank for permitting the oil to flow from the lubricating contact with said part and back to the tank, under the head space in which moisture and dirt entrained at said part tend to flow back toward the tank;

at least one outlet from said head space between said oil tank and said part; and a pump for pumping air into a head space of said tank, from externally of said system, for causing an overpressure in said head space of said tank, thereby causing an air flow in said head space of said return line counter to the flow of oil returning to said tank in said return line, and sweeping at least some of said moisture and dirt in said head space of said return line out of said outlet with said air of said air flow.

5. The system of claim 4, wherein:

said at least one outlet is located adjacent said oil tank.

6. The system of claim 4, further comprising:

a valve disposed in controlling relation to said head space of said return line.

7. The system of claim 4, wherein:

said at least one return line comprises a plurality of return lines each having said at least one outlet; and control means is provided for causing said air flow to be equivalent in amount in each said return line.

8. The system of claim 7, wherein:

each said control means comprises a respective impeller disposed in each said return line and arranged to be turned by the oil returning in the respective return line; each said impeller extending into said head space of the respective return line.

9. The system of claim 7, wherein:

each said control means comprises a respective plate positionally adjustably disposed in each said return line and extending into said head space of the respective said return line.

10. The system of claim 7, wherein:

each said control means comprises an element hingedly mounted by a hinge to the respective return line and disposed therein to have a portion thereof located distally of said hinge arranged to float on the oil returning in the respective return line, and to partially obstruct said head space between said portion and said hinge.

* * * * *

UNITED STATES PATENT AND TRADEMARK OFFICE
CERTIFICATE OF CORRECTION

PATENT NO. : 5,577,575
DATED : November 26, 1996
INVENTOR(S) : Mielo

It is certified that error appears in the above-indentified patent and that said Letters Patent is hereby corrected as shown below:

On the title page:

change item [22] to read: --PCT Filed: Jan. 3, 1994--;

add item [86], to include:
--PCT No.: PCT/FI94/00001--;
--§ 371 Date: Jun. 30, 1995--;
--§ 102(e) Date: Jun. 30, 1995--; and add item [87], to include:
--PCT Pub. No.: WO94/16262--;
--PCT Pub. Date: Jul. 21, 1994--.

Signed and Sealed this

Eighth Day of April, 1997

Attest:

BRUCE LEHMAN

*Attesting Officer*    Commissioner of Patents and Trademarks